United States Patent [19]
Cox

[11] 4,162,802
[45] Jul. 31, 1979

[54] PERMANENT FLARELESS TUBE CONNECTOR

[75] Inventor: Robert G. Cox, Rives Junction, Mich.

[73] Assignee: Aeroquip Corporation, Jackson, Mich.

[21] Appl. No.: 890,128

[22] Filed: Mar. 27, 1978

[51] Int. Cl.² ............................................. F16L 19/08
[52] U.S. Cl. .................................. 285/343; 285/382.7
[58] Field of Search ............ 285/341, 342, 343, 382.7, 285/115, 116, 248, 249

[56] References Cited

U.S. PATENT DOCUMENTS

| | | | |
|---|---|---|---|
| 1,581,538 | 4/1926 | Hill | 285/382.7 X |
| 2,698,191 | 12/1954 | Samiran | 285/341 X |
| 2,943,871 | 5/1960 | St. Clair | 285/382.7 X |
| 3,700,268 | 10/1972 | Nielsen | 285/343 |

FOREIGN PATENT DOCUMENTS

| | | | |
|---|---|---|---|
| 517157 | 2/1953 | Belgium | 285/341 |
| 1156143 | 11/1976 | United Kingdom | 285/343 |

*Primary Examiner*—Dave W. Arola
*Attorney, Agent, or Firm*—Beaman & Beaman

[57] ABSTRACT

A flareless connector for soft metal tubes connecting a tube to a connector body having a nipple received within the tube end. A compression nut threaded upon the connector body radially inwardly deforms a soft mallable compression sleeve into engagement with the tube in radial alignment with a groove defined in the connector body nipple deforming the tube into the nipple permanently sealing the tube to the nipple in metal-to-metal contact, the compression sleeve being formed to facilitate radial compression.

4 Claims, 4 Drawing Figures

PERMANENT FLARELESS TUBE CONNECTOR

BACKGROUND OF THE INVENTION

The invention pertains to a flareless tube connector for soft metal tubes wherein a compression nut inwardly radially deforms a compression sleeve and the material of the tube into metal-to-metal contact with a tube connector body nipple.

Compression fittings for soft metal tubes, such as those formed of copper or aluminum commonly employ a sleeve or bushing which slips over the end of the tubes and is compressed on the tube by means of a compression nut threaded upon the tube connector body to which the tube is to be attached. Such conventional fittings do not employ an internal support for the tube, and rely upon the metal-to-metal contact between the compression nut and bushing or sleeve with the outer surface of the tube to produce sealing.

While such known compression fittings have enjoyed success in many static installations, such as in plumbing and water distribution systems, such conventional compression fittings will often leak, or fail to maintain the assembly of the tube and the connector body, if relative movement between the tube and body takes place. Further, such conventional fittings will permit the tube to be axially withdrawn from the connector body under tension forces if a fitting is not properly assembled due to insufficient interconnection between the sleeve and the compression nut, or collapse of the tube.

Another deficiency with known compression fittings for use with soft metal tubes lies in the fact that the preferred torque on the compression nut is difficult to ascertain, and in the assembly of such fittings it is common to either under torque or over torque the compression nut, and in either instance fitting failure may occur.

It is an object of the invention to provide a permanent flareless tube connector for soft metal tubes utilizing a compression nut and deformable sleeve wherein tightening of the compression nut forms a permanent metal-to-metal seal between the tube and the tube connector body.

A further object of the invention is to provide a flareless tube connector for soft metal tubes wherein a compression nut is utilized to inwardly deform a compression sleeve upon an internally supported tube and the completion of assembly of the compression nut on the tube connector body is readily discernable whereby over torquing and under torquing is eliminated, and the operator is aware of the proper assembly being completed.

Yet another object of the invention is to provide a permanent flareless connector for soft metal tubes utilizing a nipple located upon a tube connector body over which the tube is inserted, and wherein a compression nut deforms an annular compression sleeve upon the tube to deform the tube material onto mechanical sealing and gripping surfaces defined on the tube connector body nipple.

Another object of the invention is to provide a permanent flareless connector for soft metal tubes utilizing a compression nut and radially deformable sleeve wherein the sleeve configuration aids in its deformation and is fool proof in its assembly upon the tube.

Additionally, a further object of the invention is to produce a permanent flareless tube connector for soft metal tubes utilizing a tube connector body having a nipple received within the tube wherein the nipple supports the tube against side loading forces such that the fitting is capable of resisting high lateral forces without leaking resulting in a fitting capable of installation in high vibration and abuse environments not suitable for conventional compression tube fittings.

In the practice of the invention a tube connector body includes an annular nipple adapted to be received within the end of a soft metal tube. The body also includes exterior threads for receiving a compression nut and a radial abutment surface is defined inwardly of the threads against which the compression nut bottoms at the completion of assembly.

The connector body further includes an abutment surface adjacent the nipple against which the tube end abuts during initial assembly and an annular compression sleeve also engages this abutment surface during threading of the compression nut located upon the tube as it engages the threads of the body. A cam surface upon the compression nut radially inwardly deforms a portion of the compression sleeve against the tube and deforms the tube material into an annular groove defined upon the body nipple. The nipple groove includes a shoulder surface against which the deformed tube materail engages which prevents axial withdrawal of the tube on the nipple and a metal-to-metal seal exists between the deformed tube material and the nipple.

The portion of the compression sleeve engaged by the compression nut cam surface is of a greater radial dimension than a hinging portion defined upon the sleeve to facilitate inward sleeve deformation against the tube, and in the preferred sleeve embodiment a greater wall thickness is defined upon the sleeve adjacent each of its axial ends as compared with the sleeve central wall thickness which is of a lesser radial dimension to facilitate sleeve deformation. The symmetrical sleeve configuration permits the sleeve to properly function regardless of which end thereof is initially inserted on the tube prior to assembly of the connector body and compression nut.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
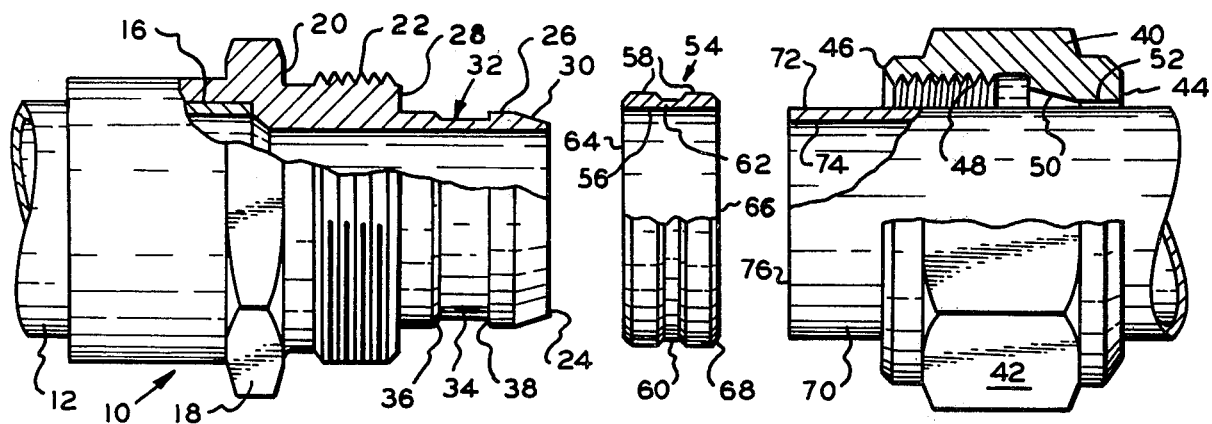
FIG. 1 is an exploded, elevational view, partially sectioned, illustrating the tube connector body, compression nut, compression sleeve and tube prior to assembly of the sleeve on the tube and engagement of the nut with the connector body.

In the drawings the tube connector body 10 is illustrated as being mounted upon a conduit 12, and it will be appreciated that the body 10 may alternatively take the form of an elbow, Tee, threaded adapter or the like as is well known in the conduit system art. The body 10 is of an annular configuration including an internal bore 14, and in the illustrated embodiment, is provided with the conduit socket 16 in which the conduit 12 is soldered or otherwise sealed.

The body 10 further includes a hexagonal flange 18 having wrench flats defined thereon, and the radial flange surface 20 constitutes a nut abutment surface as will be described. External threads 22 are defined on the body intermediate the flange 18 and the body outer end 24, and the region adjacent the outer end constitutes a nipple 26 of annular configuration and of a diameter reduced with respect to that of the threads 22 resulting in the formation of the radial abutment shoulder surface 28 intermediate the threads and the nipple.

The nipple 26 is of a generally cylindrical configuration including a tapered nose surface 30 adjacent end 24, and an annular groove 32 is defined in the nipple outer surface. The groove includes a cylindrical base surface 34, and inner shoulder surface 36, and an outer shoulder surface 38. The shoulder surfaces 36 is of conical configuration disposed at approximately 45° to the axis of the body 10, and the surface 38 defines a radial shoulder perpendicular to the axis of body 10 which faces away from the body end 24.

The connector assembly also includes a compression nut 40 of annular configuration exteriorly provided with hexagonally oriented wrench flats 42 of conventional nature. The inner end of the compression nut is defined by an edge 44, while the outer end of the compression nut is formed by a surface 46. Internally, the nut 40 is provided with threads 48 adapted to mate with the body threads 22, and a conical compression or cam surface 50 is defined within the bore of the compression nut diverging toward the nut end 46, and radially terminating in a cylindrical surface 52 of a diameter slightly larger than the diameter of the tube with which the connector is employed.

Figures 2, 4:
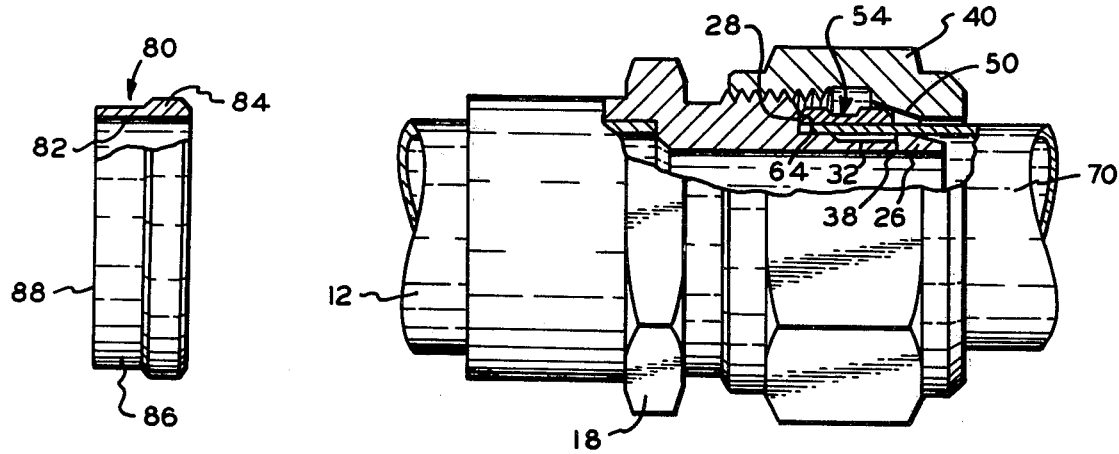
FIG. 2 is an elevational view, partially sectioned, illustrating the relationship of the components of the connector during the initial stage of assembly upon the connector nut being threaded upon the body, and prior to deformation of the sleeve and tube.
FIG. 4 is an elevational view, partially sectioned, illustrating a non-symmetrical embodiment of compression sleeve.
Figure 3:
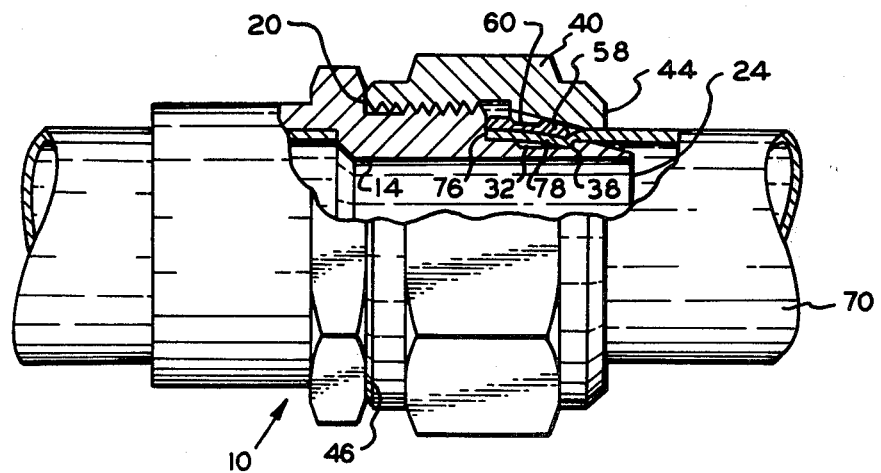
FIG. 3 is an elevational view, partially in section, illustrating the relationship of components of the connector at completion of the assembly.

The third component of the connector in accord with the invention comprises the compression sleeve 54 which is of the preferred configuration illustrated in FIGS. 1-3. The compression sleeve is of an annular form and is formed of a soft metal such as lead, soft aluminum, soft copper or soft brass.

The sleeve 54 is internally defined by the cylindrical surface 56 of a diameter only slightly greater than that of the tube to be connected to the body 10 wherein the sleeve may be readily inserted over the tube outer surface. Externally, the sleeve is formed with a pair of axially spaced portions 58 of greater wall thickness separated by a groove 60 defining a minimal wall thickness portion 62 functioning as a hinge portion for a purpose later described. For purpose of description, the "inner" end of the sleeve is designated as 64, while the "outer" sleeve end is designated 66. Oblique conical surfaces 68 relieve the intersection of the outer surfaces of the portions 58 and their associated sleeve end.

Prior to assembly the components of the connector, and tube, are generally related as shown in FIG. 1. The tube 70 is of the usual construction including an outer cylindrical surface 72, and an inner cylindrical bore 74. The tube is preferably provided with a squared end 76, and is formed of a soft metal such as soft aluminum, soft copper or soft brass.

The compression nut 40 is placed on the end of the tube 70 as shown in FIG. 1, and the tube readily receives the nut as the diameter surface 52 is greater than the tube diameter. Next, the compression sleeve 54 is placed upon the tube and the sleeve pushed toward the compression nut.

The tube 70 is then inserted upon the connector body nipple 26 until the tube end 76 engages the radial abutment surface 28, and at this time the nut 40 is moved to the left on the tube to permit the nut to be threaded upon the body threads 22. The nut is hand tightened on the threads 22 to position the components as shown in FIG. 2 wherein the nut cam surface 50 will have engaged the adjacent sleeve portion 58 and axially translated the sleeve 54 to the left such that the sleeve end 64 abuts the body surface 28.

With reference to FIG. 2, it will be noted that the sleeve is now positioned immediately "above" the body nipple and the relative axial dimensions of the sleeve 54 and groove 32 are such that the groove will be located "below" the right sleeve portion 58, and the sleeve hinge portion 62, and it is significant to note that the axial dimension from the groove surface 38 to the abutment surface 28 is no greater than, and preferably slightly less, than the axial dimension of the sleeve 54 whereby the relationship shown in FIG. 2 between the sleeve and the groove is achieved i.e. the sleeve end 66 is in radial alignment with groove surface 38.

After hand tightening, the operator will place a wrench upon the body wrench flats, and nut flats 42 and fully tighten the compression nut 40 upon the body 10 until the nut surface 46 bottoms against the body surface 20. The engagement of the surfaces 46 and 20 will be readily appreciated by the installer and will indicate the completion of the assembly.

During the final tightening of the compression nut from the relationship shown in FIG. 2 to that shown in FIG. 3 the movement of the nut to the left causes the nut cam surface 50 to force the engaged sleeve portion 58 radially inwardly throughout its circumference deforming the tube material 78 radially inward of the compressed sleeve portion into the groove 32 as will be appreciated from FIG. 3. This radial inward deformation of the sleeve is facilitated by the minimum wall thickness of the sleeve hinge portion 62, and as the axial dimension of the groove 32 is sufficient to "underlie" the right sleeve portion 58 and portions 62 the resultant inward radial deformation of the sleeve and tube material will not be hindered by the groove and a full radial deformation of the sleeve and tube material into the groove 32 will be achieved.

Because the tube material is soft the deformation thereof into the groove 32 is beyond the elastic limit of the tube material and a permanent deformation occurs. The engagement of the tube material with the groove and the groove shoulder surface 38 provides a metal-to-metal seal between the tube 70 and body 10, and the permanent deformation of the tube material into the groove and the fact that the surface 38 faces away from the nipple end 24 makes the connection permanent preventing axial withdrawal of the tube from the nipple even under high axial tension forces and the sharp corner at 38 aids in sealing.

As will be noted in FIG. 3, the axial length of the nipple 26 is such that the end 24 extends into the tube 70 further than the nut end 44 extends over the tube resulting in an inner support of the tube "beyond" the compression nut. In tests, this inner support of the tube 70 inwardly of the compression nut permits very high side loading forces to be imposed upon the tube without leakage occurring, and the nipple nose surface 30 will prevent puncture of the tube even though lateral deformation of the tube has occurred with respect to the axis of the body 10.

In the aforedescribed embodiment of the compression sleeve 54 the symmetrical sleeve configuration eliminates the necessity for the installer to place the sleeve upon the tube 70 in any particular manner. However, it is to be understood that the sleeve may take a form other than that shown in FIGS. 1-3 wherein the inventive concept may still be practiced, and one form of such a sleeve variation is shown in FIG. 4. In the embodiment of FIG. 4 the sleeve 80 is internally provided with bore 82, and it is exteriorly defined by the portion 84 of enlarged wall thickness, and the axial portion 86 of a reduced wall thickness. The portion 84 of maximum wall thickness functions in a manner identical to the portions 58 of sleeve 54, and is of identical configuration. The sleeve portion 86 adjacent portion 84 constitutes a hinge portion, and the end 88 constitutes the abutment edge for engaging the body abutment surface 28.

When using the sleeve 80, the sleeve must be inserted upon the tube 70 such that the portion 84 is placed upon the tube first so the portion 84 will be disposed toward the compression nut cam surface 50. The assembly of the connector components is identical to that described above, and upon the sleeve end 88 engaging abutment surface 28 the portion 84 will be readily deformed inwardly to deform the tube material lying thereunder, and the sleeve will deform in the hinge region 86 during sleeve compression. While the sleeve embodiment of FIG. 4 requires less metal than that of the embodiment of FIGS. 1-3, the sleeve 54 is preferable in view of its "fool proof" installation upon the tube.

It will therefore be appreciated that the connector of the invention provides a permanent metal-to-metal seal between the connector and a soft metal tube, and the deformation of the tube material 78 into the groove 32 and against the groove surface 38 performs effective sealing while simultaneously providing very high resistance to axial separation of the tube from the connector body. The internal support provided by the nipple 26 will maintain an effective seal even against high side loading forces on the tube, and as full assembly of the connector nut upon the body is readily apparent by the engagement of the nut with the body abutment surface 20 under torquing is not likely to occur, and over torquing is prevented.

It is understood that modifications to the disclosed embodiment may be apparent to those skilled in the art without departing from the spirit and scope of the invention.

I claim:

1. A flareless tube connector fitting comprising in combination, a tubular fitting body including a nipple having a free end and an outer surface for receiving a soft metal tube thereon, an annular groove defined in said outer nipple surface defining an annular shoulder surface on said nipple facing away from free end, threads defined upon said fitting body for receiving a compression nut thereon, a first radial abutment shoulder defined on said fitting body adjacent said threads facing said nipple free end, a second radial abutment shoulder defined on said fitting body adjacent said nipple and facing said nipple free end, a threaded annular compression nut adapted to be threaded upon said fitting threads, said nut having an annular inner conical cam compression surface radially positioned over said nipple surface upon said nut being fully assembled to said fitting body, and an annular radially deformable compression sleeve having first and second ends circumscribing a tube inserted on said nipple whereby said sleeve first end engages said second abutment shoulder and said sleeve second end engages said nut cam compression surface, said sleeve being formed of a soft metal and including a central region intermediate said ends thereof, the radial wall thickness of said sleeve at said central region being less than the sleeve radial wall thickness at said second end whereby the reduced wall thickness at said central region defines a hinge portion and facilitates the inward sleeve deformation adjacent said second end thereof, said hinge portion and said second end of said sleeve being in radial alignment with said annular groove whereby tightening of said nut deforms said sleeve second end thereof radially inwardly deforming the tube material into said nipple groove and into engagement with said nipple annular shoulder surface, said nut abutting said first radial abutment shoulder upon complete assembly of said fitting body and nut.

2. In a flareless tube connector fitting as in claim 1 wherein said sleeve radial wall thickness adjacent said first end is greater than that at said sleeve central region.

3. In a flareless tube connector fitting as in claim 1 wherein said sleeve second end is in substantial radial alignment with said nipple annular shoulder surface during engagement of said sleeve first end with said second abutment shoulder and prior to deformation of said sleeve.

4. In a flareless tube connector fitting as in claim 1 wherein the length of said sleeve as defined by said first end thereof is substantially equal to the distance separating said second radial abutment shoulder and said annular shoulder surface defined on said nipple.

* * * * *